(12) United States Patent
Ottosson

(10) Patent No.: US 7,806,086 B2
(45) Date of Patent: Oct. 5, 2010

(54) PET TOY

(76) Inventor: Nina Ottosson, Sjöåsvägen 2, SE-69141 Karlskoga (SE)

( * ) Notice: Subject to any disclaimer, the term of this patent is extended or adjusted under 35 U.S.C. 154(b) by 156 days.

(21) Appl. No.: 11/944,688

(22) Filed: Nov. 26, 2007

(65) Prior Publication Data

US 2009/0133639 A1 May 28, 2009

(51) Int. Cl.
*A01K 29/00* (2006.01)
(52) U.S. Cl. .................. 119/707; 119/702
(58) Field of Classification Search .......... 119/707, 119/702, 709–711; 2/247–254; 428/33, 428/44–63; *A01K 29/00*
See application file for complete search history.

(56) References Cited

U.S. PATENT DOCUMENTS

| | | | | |
|---|---|---|---|---|
| 2,248,768 A * | 7/1941 | Licht | ............ | 5/485 |
| 2,711,546 A * | 6/1955 | Licht | ............ | 5/485 |
| 4,631,765 A * | 12/1986 | Casey | ............ | 5/417 |
| 4,988,556 A * | 1/1991 | Nilsen et al. | ............ | 428/195.1 |
| 5,427,239 A * | 6/1995 | Hunt | ............ | 206/372 |
| 5,499,403 A * | 3/1996 | Harrigan | ............ | 2/247 |
| 6,243,896 B1 * | 6/2001 | Osuna et al. | ............ | 5/502 |
| 6,378,456 B1 * | 4/2002 | Jerome | ............ | 119/28.5 |
| 6,470,830 B2 * | 10/2002 | Mann | ............ | 119/709 |
| 7,526,824 B2 * | 5/2009 | Pontes | ............ | 5/653 |
| 2001/0042517 A1 * | 11/2001 | Ikegami et al. | ............ | 119/161 |
| 2001/0047770 A1 * | 12/2001 | Pontes | ............ | 119/707 |
| 2005/0092258 A1 * | 5/2005 | Markham | ............ | 119/707 |
| 2008/0113323 A1 * | 5/2008 | McElhoe | ............ | 434/260 |

* cited by examiner

*Primary Examiner*—Son T Nguyen
*Assistant Examiner*—Shadi Baniani
(74) *Attorney, Agent, or Firm*—Jeffrey S. Melcher; Manelli Denison & Selter PLLC

(57) ABSTRACT

This invention relates to a Pet toy, comprising a body structure (1) provided with a plurality of retaining compartments (2) presenting openings (3), arranged to enable hiding and retrieving of objects (4) therein, wherein said body structure (1) comprises a plurality of flexible, sheet formed layers (10, 11, 12) fixedly attached to each other one on top of the other, at least one lower layer (11) has a larger size than a layer (12) positioned on top of the lower layer (11), and wherein said retaining compartments (2) are in the form of pockets between next to each other positioned layers (10, 11, 12).

1 Claim, 3 Drawing Sheets

PET TOY

TECHNICAL FIELD

This invention relates to a pet toy, comprising a body structure provided with a plurality of retaining compartments presenting openings, arranged to enable hiding and retrieving of objects therein.

BACKGROUND

There is a strive in today's society to be able to provide an environment that is more and more optimized from a viewpoint of the pet. This can for instance be seen in the recent development of different items specially adapted for pets, for example food, clothing, etc. Also the mental health of pets has been more and more put in focus. One aspect that has been under development is the need of stimuli to pets, especially pets living in urban environments presenting a limited amount of mentally stimulating objects. It has been identified that many pets, especially cats and dogs, can acquire positive mental stimulation in conjunction with toys. However, the existing kind of toys of today are limited and often also either rather expensive and/or difficult to combine/use in modern homes.

SUMMARY OF THE INVENTION

It is an object of the invention to present a new kind of toy pet that practically and easily can be used, without risk of causing damages, in modern home environments. This is achieved by means of a toy pet as depicted in the amended claims.

Thanks to the use of flexible sheets the toy according to the invention does not present any hard parts that could cause damages, e.g. scrapes in the floor, etc. and does therefore also present a kind of toy that is easily stuffed away in different kind of spaces. Further the design provides for a toy that may be produced very cost-efficiently. Moreover it is also easily transported. Finally, tests have shown that it presents a toy that is surprisingly much appreciated by many pets, e.g. cats and dogs.

Further advantages according to the invention will be apparent from the description below.

BRIEF DESCRIPTION OF THE DRAWINGS

In the following the invention will be described in more detail with reference to the drawings, wherein.

DETAILED DESCRIPTION

Figure 1:
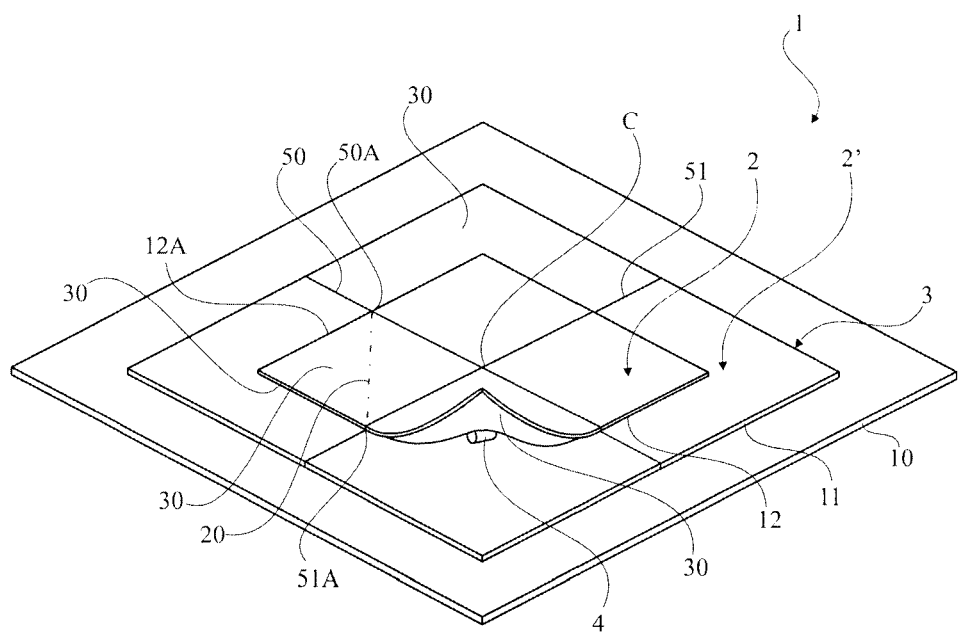
FIG. 1 shows a perspective view of a toy according to the invention according to a first embodiment.

In FIG. 1 there is shown a first embodiment according to the invention. There is shown in a perspective view a toy pet 1 comprising three layers 10, 11, 12 of flexible sheet-like formed material, preferably some kind of cloth, (which may be produced by combining different kind of cloths, or one sub-layer of cloth with some kind of plastic or polymer like sheets). The sheets 10, 11, 12 are joined together by means of two hems 50, 51. The hems extend continuously across a substantial part of the total width of the body 1, i.e. extending a longer distance than the width of the smallest layer (normally the top layer).

In embodiments that have been successfully tested, the following materials were used; fur fabric, pile cloth, plush, fleece and different kind of woven fabrics of thicker kind, preferably 3-20 mm thick, more preferred 5-12 mm. The width/diameter of the bottom layer that has been tested and worked well, ranges from 400 mm to 1200 mm, wherein the decrease of the width from one layer to next layer on top thereof has been in the range of 30-200 mm, preferably 50-120 mm.

In FIG. 1 it is shown that the hems extend across the edges of the top layer 12 and also across the edges of the second layer 11. Each layer 10, 11, 12 has a square configuration and is positioned such that its corners lie substantially along a straight line coinciding with the corners of every other layer. The hems 50, 51 are positioned substantially along a straight line perpendicularly to each other, and crossing each other at the center C. Further the hems 50, 51 extend substantially centrally between the corners. As a consequence there will be created pockets 2 with openings 3. Due to using two hems 50, 51 there will be created four pockets 2 between each neighboring portion of the hems 50, 51. Hence there will be four pockets 2 between the top layer 2 and the second layer 11 and there will also be created four pockets 2' between the second layer 11 and the bottom layer 10 (third layer).

Further due to using square layers 10, 11, 12 and the positioning of the hems 50, 51 there will be formed openings 3 provided with tabs 30 protruding beyond a line 20 joining the attachment points 50A, 51A for neighboring edges of each layer. (the line 20 is merely indicated for one part of the top layer 12A). These tabs 30 make it easy to open up the opening 3 that exists for each one of the pockets 2, 2', facilitating hiding of objects 4 within one or a plurality of the pockets 2, 2'.

The toy pet 1 is used in such a manner that it is positioned onto a substantially flat surface, e.g. the floor, which thanks to the use of soft and flexible materials makes it easy and lenient to use in any home environment. Thereafter a tab 30 is easily lifted by means of gripping it to position an object 4, e.g. a pet candy, into one of the pockets 2, 2'. As many objects 4 as desired may be hidden/put into the pockets 2, 2', where after the pet will have to be active both physically and mentally to identify and eventually get hold of the object 4.

Figure 2:
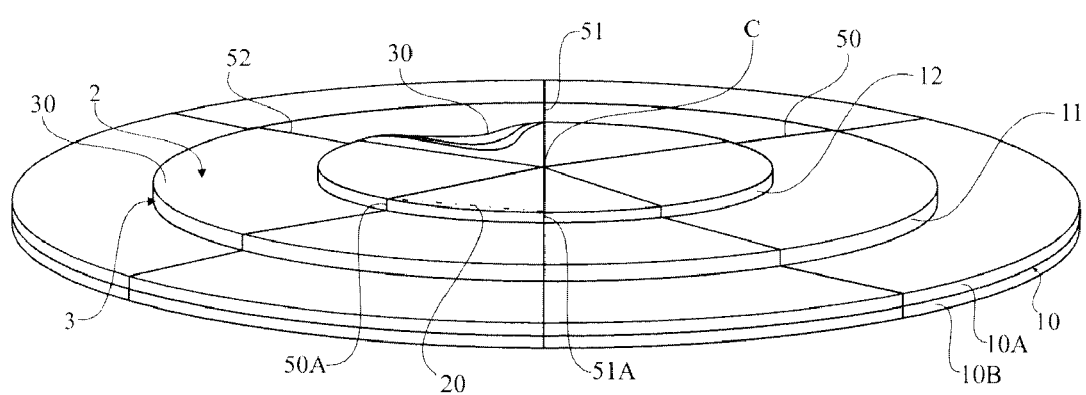
FIG. 2 shows an embodiment according to a second embodiment according to the invention.
Figure 3:
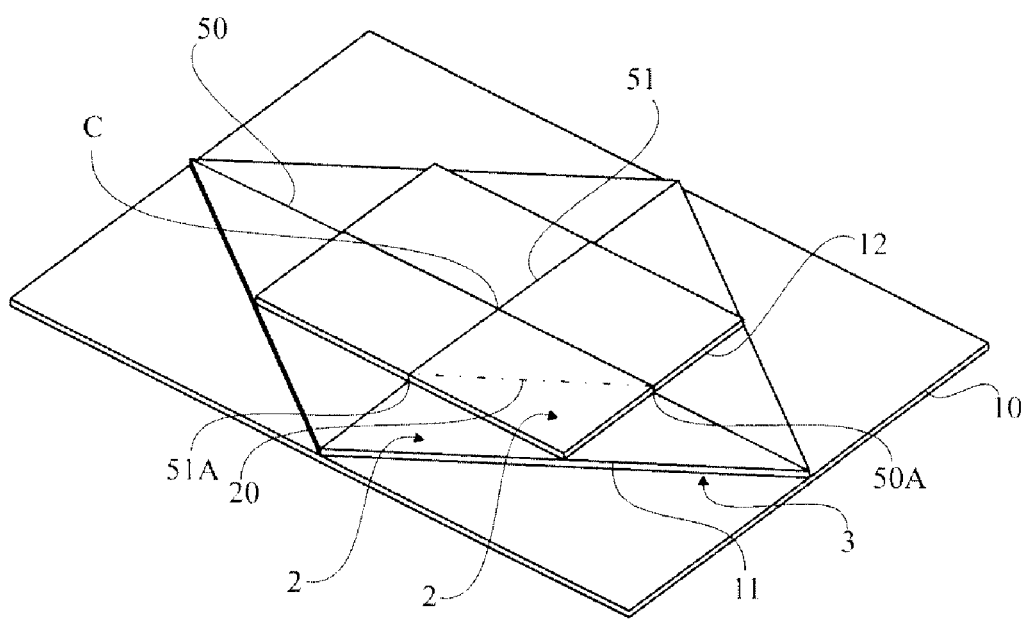
FIG. 3 shows a further embodiment.

In FIGS. 2 and 3 there is indicated that the toy pet according to the invention may be formed in many varying modes.

In FIG. 2 it is shown that instead of using square layers 10, 11, 12 each layer is formed as a circle, and also that one layer 10 may be formed by two sub layers 10A, 10B joined/fixed by the hems 50, 51, 52. This kind of design may be especially suitable for larger pets, since one of the sub layers 10A, 10B may then be made of a more rigid and/or heavy material, to make it difficult for the pet to bite into and lift the toy, i.e. eliminating or at least minimizing the possibility for the pet to shake out the hidden object 4. Further this latter kind of embodiment may be combined with using a material (e.g. a resilient foam layer) in on or both of the sub layers 10A, 10B to create a suitable sleeping place for the pet.

Also in an embodiment shown in FIG. 3, there will be formed a kind of tab 30 protruding beyond the virtual line 20 between two neighboring attachment points 50A, 51A of the edges of a layer. Further FIG. 2 shows that the number of hems may be varied depending of the size of the pockets that is desired. Here three hems 50, 51, 52 are being used, creating six pockets 2 in between each layer.

In FIG. 3 there is shown that a varying form may also be used between different layers in one and the same toy, e.g. square combined with oblong. Further FIG. 3 shows that the use of a tab 30 may not always be a necessity but that an appropriate opening 3 may also be formed if the line 20 between two neighboring does coincide with the edge of one layer. This is especially true if the layers have some kind of resiliency, which is often the case in connection with the use of cloths. However the use of one or more tabs has shown to provide an advantage, since it makes it somewhat more difficult for the pet to find the object 4 which therefore makes it more stimulating.

The invention is not limited by what has been described above, but may be varied within the scope of the appended claims. For instance, the skilled person realizes that it is also foreseen that squared/rectangular sheets may be combined with circular sheets, that the amount of layers may vary (e.g. merely two, or as many as ten), that many different combinations of cloths may be used, etc.

The invention claimed is:

1. A pet toy consisting of three flexible, sheet formed layers fixedly attached to each other one on top of the other by two hems, each lower layer has a larger size than a layer positioned on top of the lower layer so that a top layer is smallest and a bottom layer is largest, the hems extending continuously a longer distance than a width of the top layer, wherein each of the layers is in the shape of a square, each layer is positioned so that the corners lie substantially along a straight line coinciding with the corners of every other layer, and two hems are positioned substantially along a straight line perpendicularly to each other and crossing each other at a center of the layers, and retaining compartments in the form of pockets between each adjacent layer of flexible material and bordered by the hems, the retaining compartments being arranged to enable hiding and retrieving of objects therein.

* * * * *